(12) United States Patent
Im et al.

(10) Patent No.: US 7,796,360 B2
(45) Date of Patent: Sep. 14, 2010

(54) PERPENDICULAR MAGNETIC RECORDING HEAD AND METHOD OF MANUFACTURING THE SAME

(75) Inventors: Young-hun Im, Suwon-si (KR); Hoo-san Lee, Osan-si (KR); Yong-su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 909 days.

(21) Appl. No.: 11/525,828

(22) Filed: Sep. 25, 2006

(65) Prior Publication Data
US 2007/0188918 A1 Aug. 16, 2007

(30) Foreign Application Priority Data
Feb. 15, 2006 (KR) .................. 10-2006-0014698

(51) Int. Cl.
G11B 5/127 (2006.01)
(52) U.S. Cl. ................. 360/125.13; 360/125.14; 360/122
(58) Field of Classification Search .................. 360/125.02–125.15, 122
See application file for complete search history.

(56) References Cited

U.S. PATENT DOCUMENTS

| | | | | |
|---|---|---|---|---|
| 5,555,482 | A * | 9/1996 | McNeil ............. | 360/119.05 |
| 6,504,675 | B1 * | 1/2003 | Murdock et al. ....... | 360/125.12 |
| 6,631,054 | B2 * | 10/2003 | Miyazaki et al. ........... | 360/317 |
| 6,940,690 | B2 * | 9/2005 | Tomiyama et al. ..... | 360/125.05 |
| 7,133,252 | B2 | 11/2006 | Takano et al. | |
| 2002/0024755 | A1 * | 2/2002 | Kim et al. .................. | 360/55 |
| 2002/0034043 | A1 * | 3/2002 | Okada et al. .............. | 360/125 |
| 2003/0151850 | A1 * | 8/2003 | Nakamura et al. .......... | 360/125 |
| 2004/0228033 | A1 * | 11/2004 | Aoki et al. .................. | 360/126 |
| 2005/0057853 | A1 * | 3/2005 | Nakamura et al. .......... | 360/125 |
| 2005/0068671 | A1 * | 3/2005 | Hsu et al. .................... | 360/125 |
| 2005/0105213 | A1 * | 5/2005 | Takeo et al. ................. | 360/125 |
| 2005/0157424 | A1 * | 7/2005 | Kuroda et al. ............... | 360/125 |
| 2005/0185335 | A1 * | 8/2005 | Nakamura et al. .......... | 360/125 |
| 2006/0002017 | A1 * | 1/2006 | Taguchi et al. ............. | 360/125 |
| 2006/0152850 | A1 * | 7/2006 | Hsu et al. .................... | 360/125 |

FOREIGN PATENT DOCUMENTS

CN 1604193 A 4/2005

(Continued)

OTHER PUBLICATIONS

Communication from the State Intellectual Property Office of P.R. China issued May 12, 2010, in counterpart Chinese Application No. 200610159511.3.

*Primary Examiner*—William J Klimowicz
(74) *Attorney, Agent, or Firm*—Sughrue Mion, PLLC

(57) ABSTRACT

A perpendicular magnetic recording head and method of manufacturing the same are provided. The perpendicular magnetic recording head records or reads information on or from a perpendicular magnetic recording medium. The perpendicular magnetic recoding head includes a coil, a main pole, and a return pole. The coil serves as a source for generating a magnetic field. The main pole and the return pole constitute a magnetic path of the magnetic field. The main pole includes an end facing the perpendicular magnetic recording medium. The end includes a leading part serving as a front side and a trailing part serving as a rear side with respect to a movement direction of the perpendicular magnetic recording medium. Both edges of the trailing part are chamfered, and the leading part has a plane inclined with respect to an air-bearing surface (ABS). The return pole has an end spaced from the main pole, and the other end connected with the main pole.

5 Claims, 9 Drawing Sheets

FOREIGN PATENT DOCUMENTS

| | | | | |
|---|---:|---|---|---|
| EP | 70907 | A1 | * | 2/1983 |
| EP | 536032 | A2 | * | 4/1993 |
| JP | 57138020 | A | * | 8/1982 |
| JP | 02168407 | A | * | 6/1990 |
| JP | 2002304703 | A | * | 10/2002 |
| JP | 2003-242607 | A | | 8/2003 |
| JP | 2005100636 | A | * | 4/2005 |
| JP | 2005-222579 | A | | 8/2005 |
| JP | 2006018902 | A | * | 1/2006 |

* cited by examiner

PERPENDICULAR MAGNETIC RECORDING HEAD AND METHOD OF MANUFACTURING THE SAME

CROSS-REFERENCE TO RELATED PATENT APPLICATIONS

This application claims priority from Korean Patent Application No. 10-2006-0014698, filed on Feb. 15, 2006, in the Korean Intellectual Property Office, the disclosure of which is incorporated herein in its entirety by reference.

BACKGROUND OF THE INVENTION

1. Field of the Invention

An apparatus and method consistent with the present invention relate to a perpendicular magnetic recording head and, more particularly, to a perpendicular magnetic recording head having an improved shape of a main pole such that the perpendicular magnetic recording head has a minimum influence by a magnetic field on a track except for an object track of a recording medium that is to be recorded, thereby achieving high density recording, and a manufacturing method thereof.

2. Description of the Related Art

Magnetic recording may be roughly classified into longitudinal magnetic recording and perpendicular magnetic recording depending on information recording methods. The longitudinal magnetic recording records information using characteristics in that the magnetized direction of a magnetic layer is aligned in parallel to the surface of the magnetic layer, and the perpendicular magnetic recording records information using characteristic in that the magnetized direction of a magnetic layer is aligned perpendicularly to the surface of the magnetic layer. Therefore, the perpendicular magnetic recording has much greater advantages than the longitudinal magnetic recording in an aspect of recording density.

FIG. 1 is a view of a conventional perpendicular magnetic recording head. Referring to FIG. 1, the perpendicular magnetic recording head includes a perpendicular magnetic recording medium 10 (referred to as a recording medium), a recording head unit 100 which records information on the recording medium 10, and a read head unit 110 which reads information recorded on the recording medium 10.

The recording head unit 100 includes a main pole P1, a return yoke 105, and a coil C. The coil C generates a recording magnetic field in order to record information on the recording medium 10. The main pole P1 and the return yoke 105 constitute a magnetic path of the recording magnetic field generated from the coil C. Each of the main pole P1 and the return yoke 105 is formed of a magnetic material such as NiFe. Here, saturation magnetic flux density Bs is formed differently by controlling a constituent ratio of the magnetic material in each of the main pole P1 and the return yoke 105. A sub-yoke 101 is formed on a lateral side of the main pole P1. Also, the sub-yoke 101 constitutes a magnetic part together with the main pole P1.

The read head unit 110 includes a first shield layer S1, a second shield layer S2, and a read sensor 111 formed between the first and second shield layers S1 and S2. The first and second shield layers S1 and S2 prevent a magnetic field generated from a magnetic element around a predetermined region $A_{RP}$ of a selected track from reaching a read sensor 111 while information is read from the predetermined region $A_{RP}$. The read sensor 111 may be at least one of a magnetoresistance (MR) device, a giant magnetoresistance (GMR) device, and a tunnel-magneto-resistance (TMR) device.

An air-bearing surface (ABS) is defined as a surface where the recording head unit 100 faces a recording layer 13 and is parallel to an X-Y plane.

A vertical component of a magnetic field applied from the main pole P1 and directed to the recording medium 10 magnetizes a magnetic domain of the recording layer 13 in order to record information. One unit magnetized in this manner is called a recording bit. As recording density increases, the size of the recording bit decreases.

The recording density is generally represented by areal density and expressed by the number of recording bits per 1 inch$^2$. That is, to increase the areal density, both a length in a down-track direction and a length in a cross-track direction of a recording bit should be reduced.

The length in the down-track direction is determined by the movement speed of the recording medium 10 and the frequency of a recording current. The length in the cross-track direction depends on the shape of the main pole P1 including the length of the main pole P1 in a Y-direction. Therefore, it is difficult to design such that the length continues to decrease as the recording density increases, and the main pole P1 should have a shape that does not influence an adjacent track to achieve stable recording performance.

SUMMARY OF THE INVENTION

The present invention provides a perpendicular magnetic recording head and method of manufacturing the same, achieving stable high density recording characteristics by improving the shape of a main pole and thus minimizing an erasing effect of an adjacent track.

According to an aspect of the present invention, there is provided a perpendicular magnetic recording head for one of recording information on a perpendicular magnetic recording medium and reading information recorded on the perpendicular magnetic recording medium, the perpendicular magnetic recording head including: a coil serving as a source generating a magnetic field for recording; a main pole forming a magnetic path of the magnetic field, having an end that faces the perpendicular magnetic recording medium, wherein the end comprises a leading part serving as a front side and a trailing part serving as a rear side with respect to a movement direction of the perpendicular magnetic recording medium; the trailing part having edges that are chamfered; the leading part having a plane inclined with respect to an air-bearing surface (ABS); a return pole forming the magnetic path of the magnetic field in cooperation with the main pole, and having one end spaced apart from the main pole at the ABS and the other end connected with the main pole.

According to another aspect of the present invention, there is provided a method of manufacturing a perpendicular magnetic recording head, the method including: forming a first insulation layer and a second insulation layer on a substrate; etching part of the second insulation layer such that the second insulation layer has a shape including an inclined plane; depositing a first magnetic layer on the first insulation layer and the second insulation layer to allow the second insulation layer embedded in the first magnetic layer; forming the first magnetic layer in a shape having a predetermined width and upper chamfered edges; forming a third insulation layer and a second magnetic layer on the first magnetic layer and the first insulation layer; and lapping the lateral sides of the first magnetic layer and the second insulation layer such that the lower part of one end of the first magnetic layer becomes a plane inclined with respect to the ABS.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF EXEMPLARY EMBODIMENTS OF THE INVENTION

Figure 2:
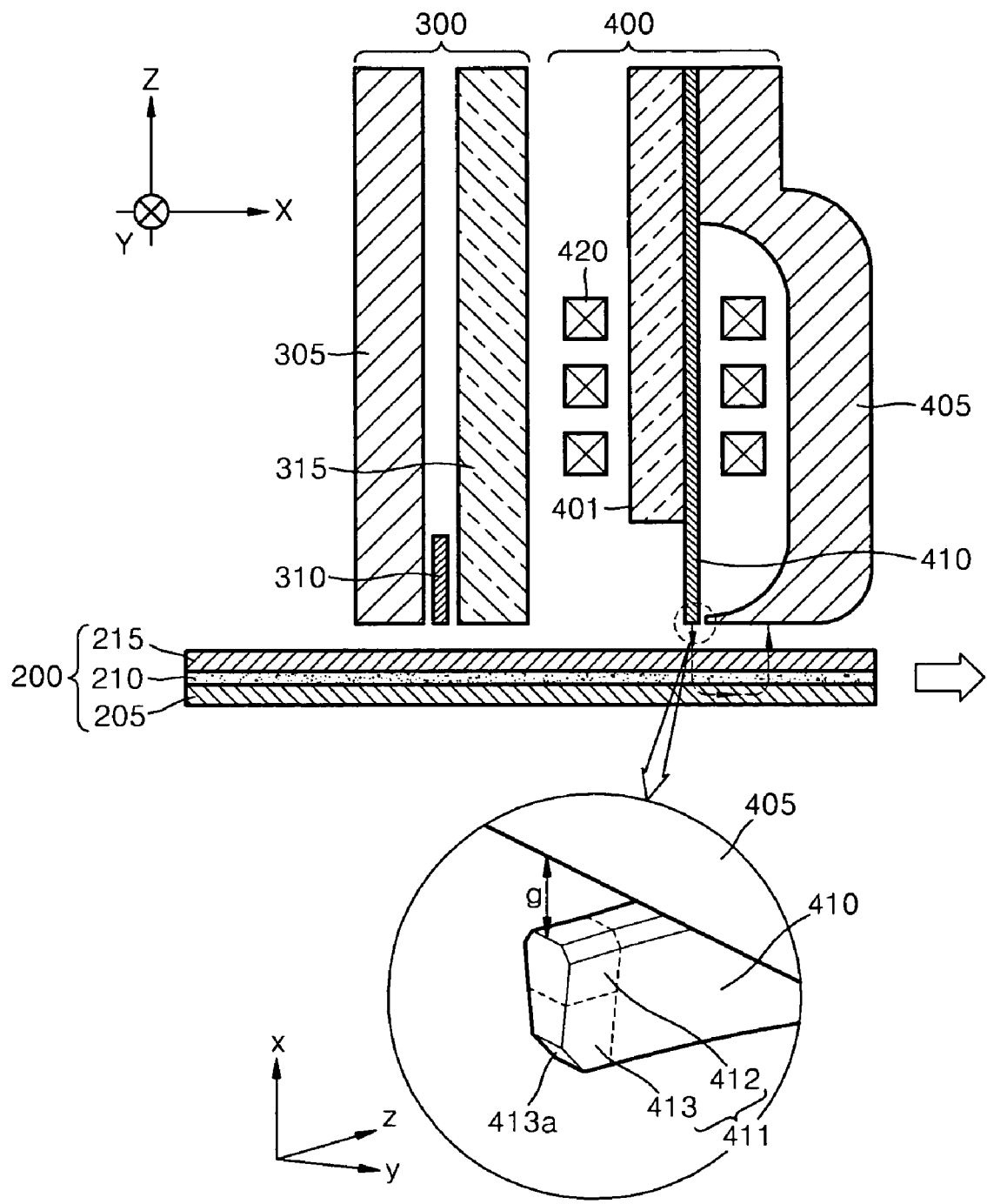
FIG. 2 is a view of a perpendicular magnetic recording head according to an exemplary embodiment of the present invention.

FIG. 2 is a view of a perpendicular magnetic recording head according to an exemplary embodiment of the present invention. Referring to FIG. 2, the perpendicular magnetic recording head includes a recording head unit 400 which records information on a perpendicular magnetic recording medium 200 (referred to as a recording medium).

The recording head unit 400 includes a coil 420 serving as a source generating a recording magnetic field, a return pole 405 forming a magnetic path of the magnetic field generated by the coil 420, and a main pole 410 having one end spaced from the return pole 405 and the other end connected with the return pole 405 to constitute the magnetic path in cooperation with the return pole 405. A sub-yoke 401 is located on the lateral side of the main pole 410 to constitute the magnetic path in cooperation with the main pole 410. One end of the sub-yoke 401 is spaced from the ABS in a direction of separation from the recording medium. Such an arrangement is for condensing the recording magnetic field to the end 411 of the main pole 410 that faces the recording medium. Since the intensity of a magnetic field condensed to the end 411 is limited by the saturation magnetic flux density of a material of the main pole 410, the main pole 410 may be formed of a material having greater saturation magnetic flux density than that of a material of the sub-yoke 401.

Since a gap of a length g is formed between the main pole 410 and the return pole 405 at the ABS, leakage magnetic flux is generated at the end of the main pole 410 in the vicinity of the gap. The recording medium 200 has a structure of a soft magnetic underlayer 205, an intermediate layer 210, and a recording layer 215. A vertical component of a recording magnetic field leaking from the main pole 410 magnetizes the recording medium 215 in a vertical direction, so that recording is performed. Therefore, a spacing distance between the return pole 405 and the main pole 410 at the ABS may be formed to be less than about 500 nm such that the recording magnetic field leaking from the main pole 410 constitutes a return path via the soft magnetic lower layer 205 of the recording medium 200.

A read head unit 300 reading information recorded on the recording medium 200 is located on the laterals side of the recording head unit 400. The read head unit 300 includes a first shield layer 305, a second shield layer 315, and a read sensor 310 located between the first shield layer 305 and the second shield layer 315. Each of the ends of the first shield layer 305, the second shield layer 315, and the read sensor 310 is placed on the same plane above the ABS.

The read sensor 310 may be a magnetoresistance device such as a GMR device and a TMR device.

An X-axis direction in the drawing is a direction in which the recording medium 200 moves and is generally called a down-track direction of the recording medium 215. An Y-axis direction is a direction perpendicular to the down track direction and is generally called a cross-track direction.

The shape of the end 411 of the main pole 410 that faces the recording medium will be describe in detail. The region of the end 411 may be divided into a trailing part 412 and a leading part 413. Here, the leading part 413 is a region serving as a front side and the trailing part 412 is a region serving as a rear side with respect to a movement direction of the perpendicular magnetic recording medium. In the drawing, an X-axis direction is a movement direction of the recording medium 200, and the ABS is in parallel to an X-Y plane.

The trailing part 412 has a shape of which two edges are cut so as to be chamfered, and the leading part 413 has a plane 413a inclined with respect to the ABS at a predetermined angle. The shape of which two edges are cut may be a shape such that a cross-section of the end 411 that faces the recording medium 200 is hexagon.

It is possible to minimize influence of the recording magnetic field from the main pole 410 on an adjacent track except an object track on which recording is to be performed by providing the shape of the main pole 410 as described above.

A recording characteristic of a perpendicular magnetic recording head according to an embodiment of the present invention will be described with reference to FIGS. 3A through 4 below.

Figure 3A:
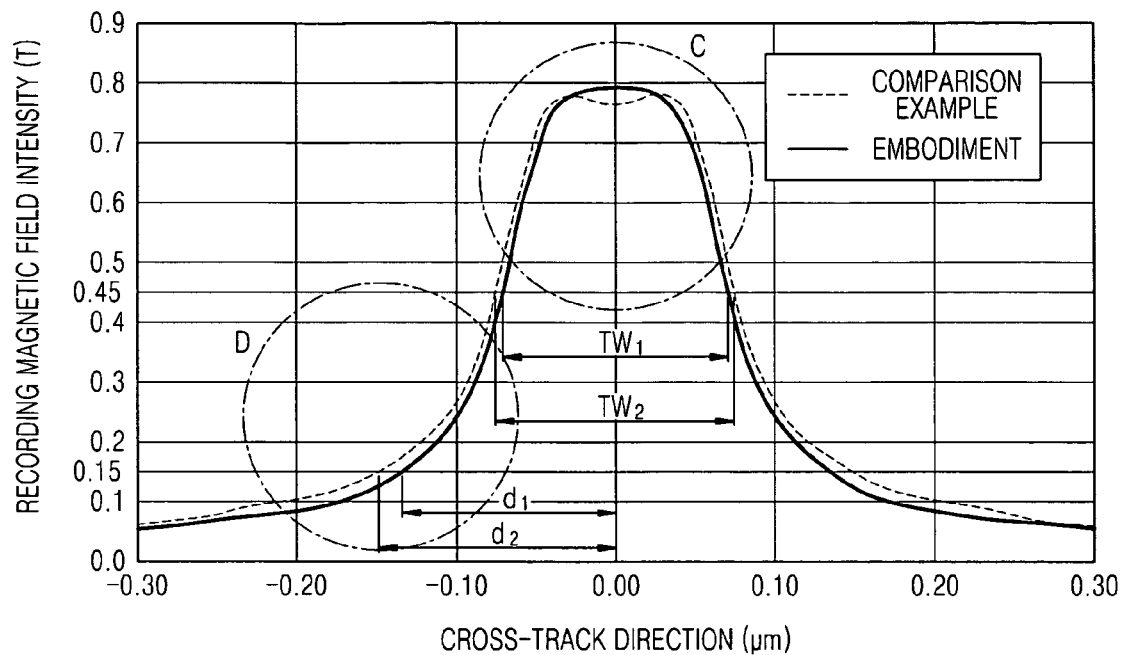
FIGS. 3A through 3C show the profiles of recording magnetic fields on a recording medium along a cross track direction according to an exemplary embodiment of the present invention and a comparison example.
Figure 3B:
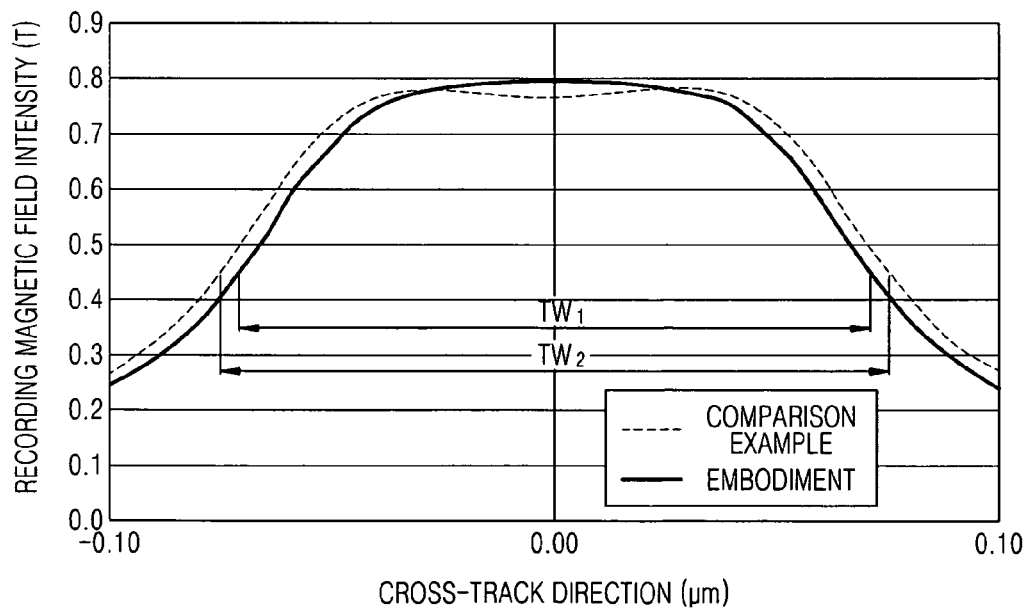
Figure 3C:
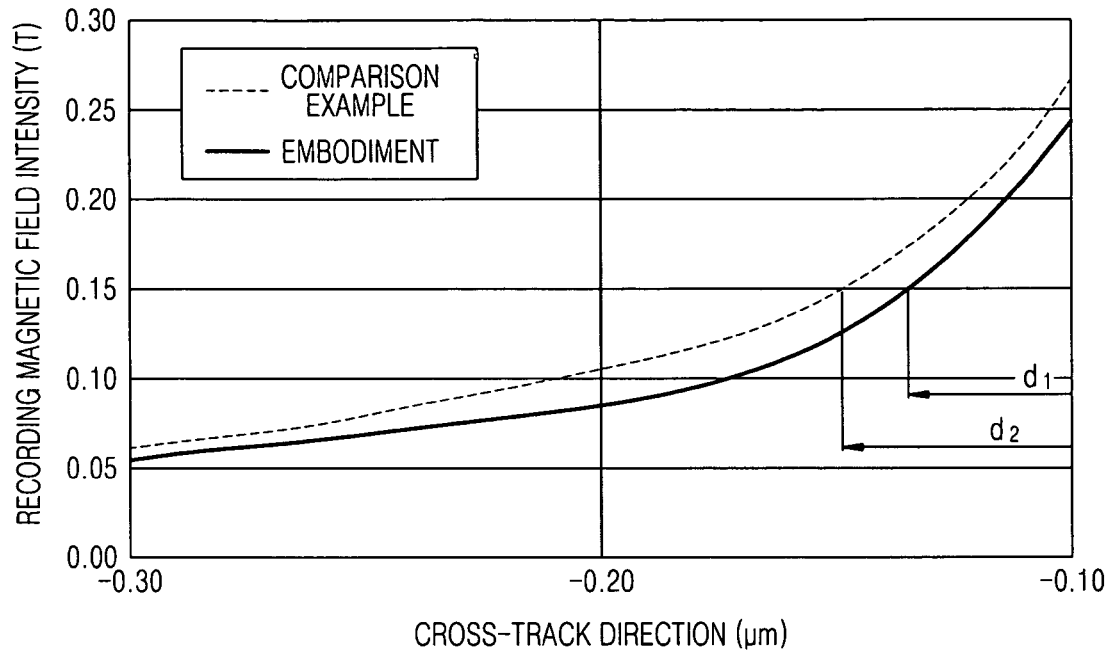

FIG. 3A shows the profiles of recording magnetic fields on a recording medium along a cross track direction according to an embodiment of the present invention and a comparison example, FIGS. 3B and 3C show enlarged views of portions C and D, respectively, in the graph of FIG. 3A.

Figure 1:
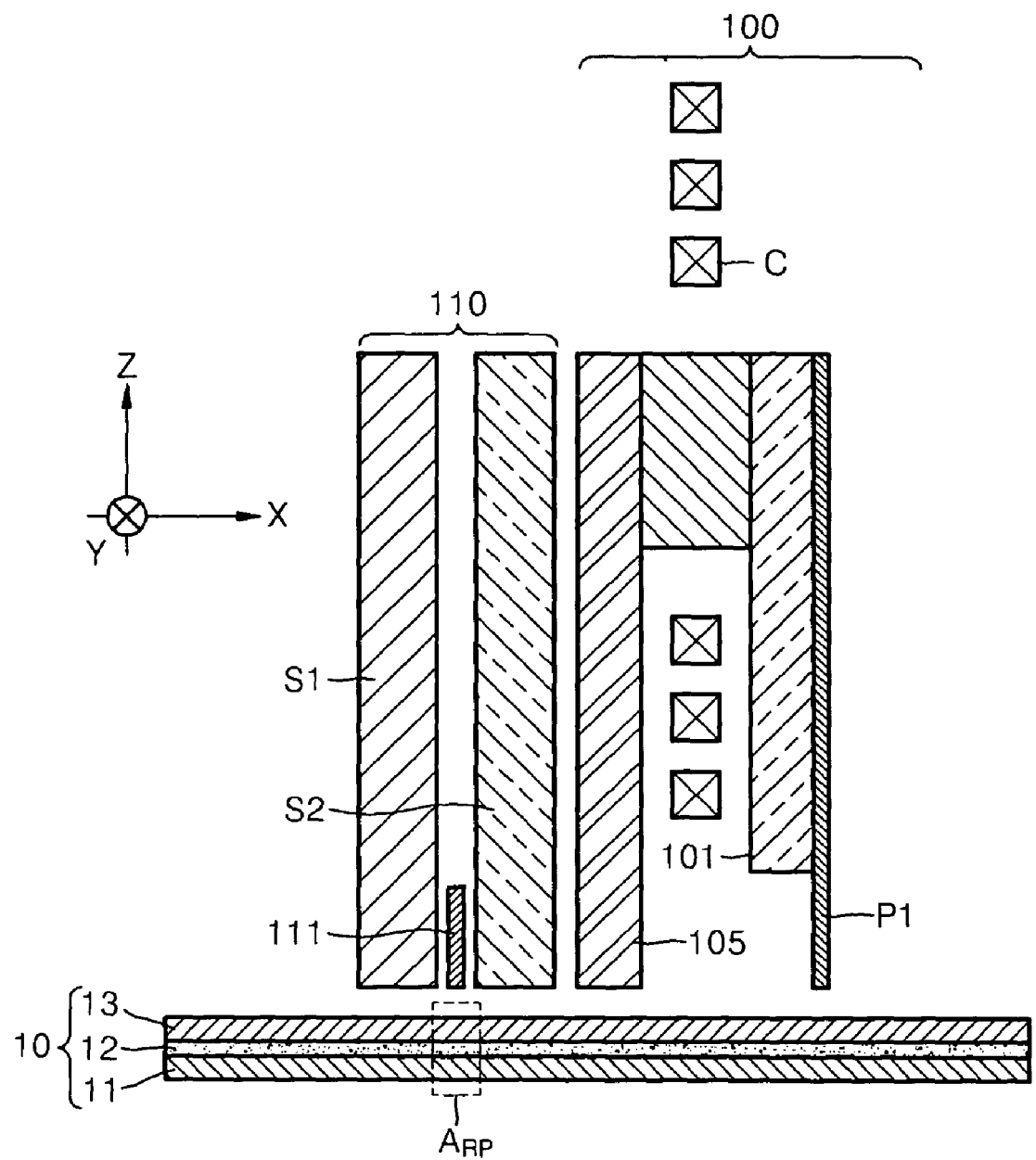
FIG. 1 is a view of a conventional perpendicular magnetic recording head.

In the comparison example, a conventional perpendicular magnetic recording head illustrated in FIG. 1 has been used. Referring to FIGS. 3A and 3B, the present invention has a greater intensity of the recording magnetic field than the comparison example in a central portion of a track on which recording is to be performed; that is, in a range marked by zero on an X-axis. As shown in FIG. 3C, the present invention has a more drastically decreasing intensity of the recording magnetic field than the comparison example in a range outside the central portion. Therefore, the present invention has an excellent recording magnetic field profile.

For example, assuming that coercivity Hc of the recording medium is 4500 Oe, cross-track direction lengths TW1 and TW2 of the present invention and the comparison example having a higher magnetic field intensity than the coercivity 4500 Oe have been examined to be about 140 nm and 152 nm, respectively. That is, TW1 is about 8% shorter than TW2. Therefore, the present invention is more advantageous for high density recording.

Also, a range influencing magnetization of an adjacent track may be compared with reference to the graph. A recording characteristic of a perpendicular magnetic recording medium is represented using nucleation field Hn as well as coercivity Hc. Here, Hn is the intensity of an external magnetic field required for initiating magnetization inversion after part of the recording medium is saturated in one direction. That is, whether recording magnetic field intensity has an influence on magnetization of an adjacent track may be determined by comparing the recording magnetic field intensity in the vicinity of the adjacent track with Hn. Assuming that Hn of a recording medium is 1500 Oe, it is considered that a position having a magnetic field intensity less than 1500 Oe does not have an influence on magnetization of an adjacent track. Distances d1 and d2 from the center in the present invention and the comparison example beginning to have a magnetic field intensity less than 1500 Oe are about 65 nm and 74 nm, respectively. That is, since a position in the present invention that does not have an influence on an adjacent track is 14% closer to the center compared to the comparison example, a track width may be also reduced by 14%.

Figure 4:
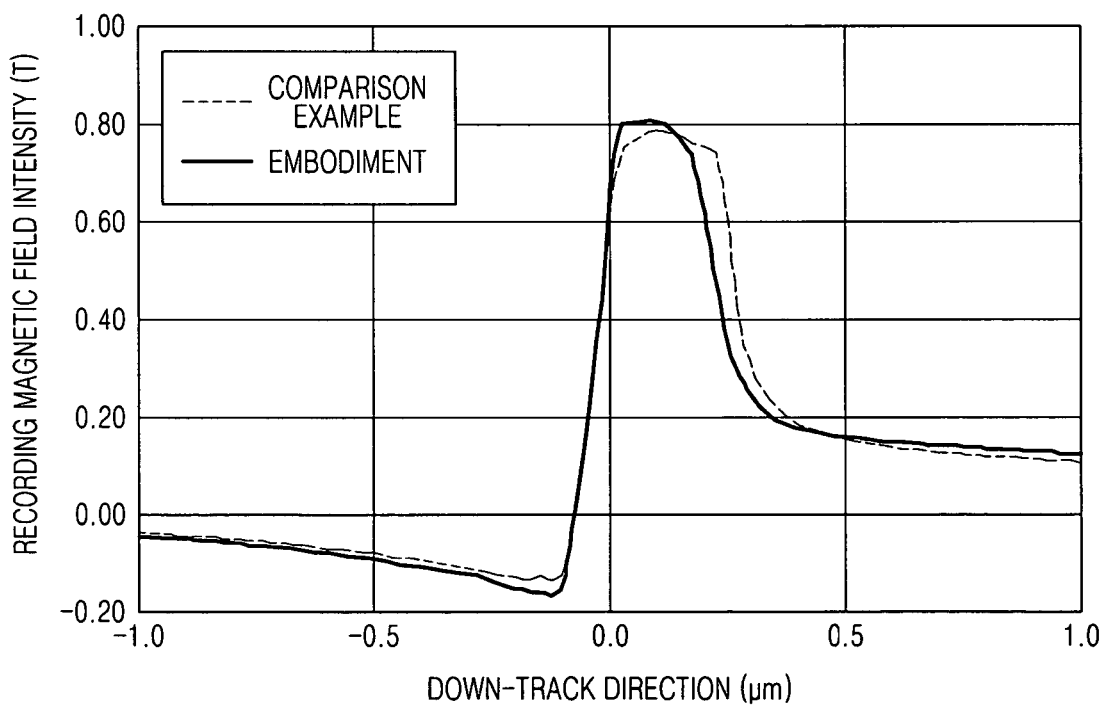
FIG. 4 shows the profiles of recording magnetic fields on a recording medium along a down track direction according to an exemplary embodiment of the present invention and a comparison example.

FIG. 4 shows the profiles of recording magnetic fields on a recording medium along a down track direction according to an exemplary embodiment of the present invention and a comparison example. Referring to FIG. 4, the exemplary embodiment of the present invention shows that a field intensity drastically changes in a region deviating from the central portion, so that it is expected that the present invention has a relatively excellent signal-to-noise ratio (SNR) characteristic compared to the comparison example.

A method of manufacturing a perpendicular magnetic recording head according to an exemplary embodiment of the present invention will now be described with reference to FIGS. 5A and 5J below.

Figure 5A:
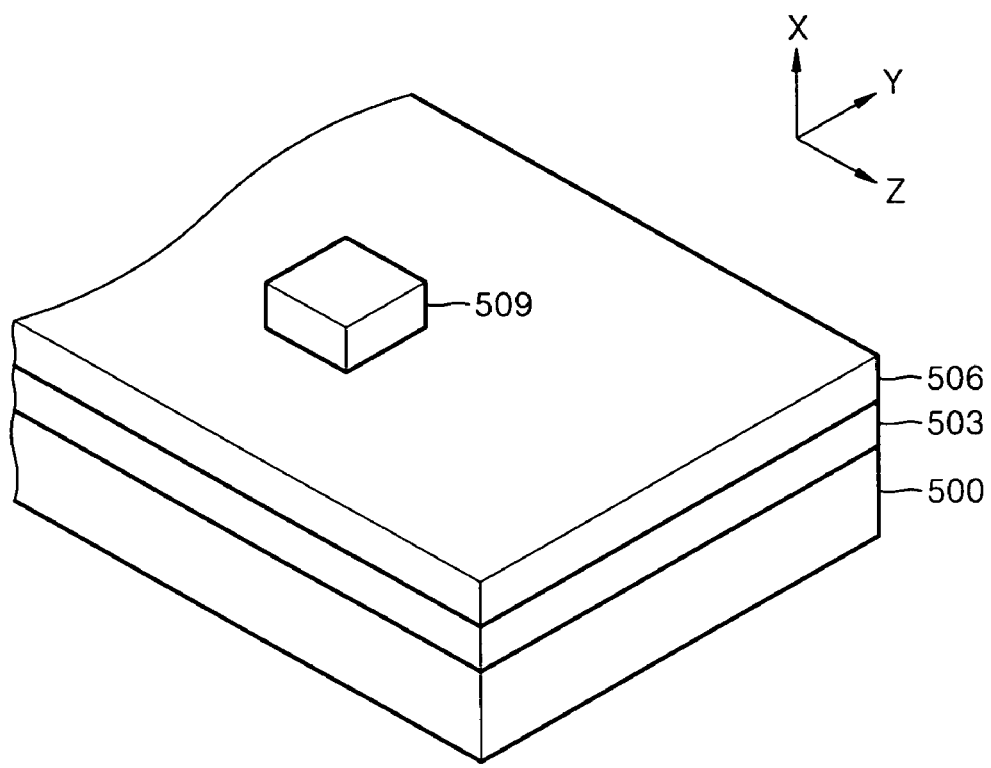
FIGS. 5A through 5J show processes of a method of manufacturing a perpendicular magnetic recording head according to an exemplary embodiment of the present invention.

Referring to FIG. 5A, a first insulation layer 503 and a second insulation layer 506 are sequentially formed on the substrate 500, and a first photoresist 509 is formed on a predetermined region of the second insulation layer 506. At this point, the substrate 500 may be formed of $Al_2O_3$—TiC. For example, an $Al_2O_3$—TiC substrate on which a read head unit is formed may be used.

Figure 5B:
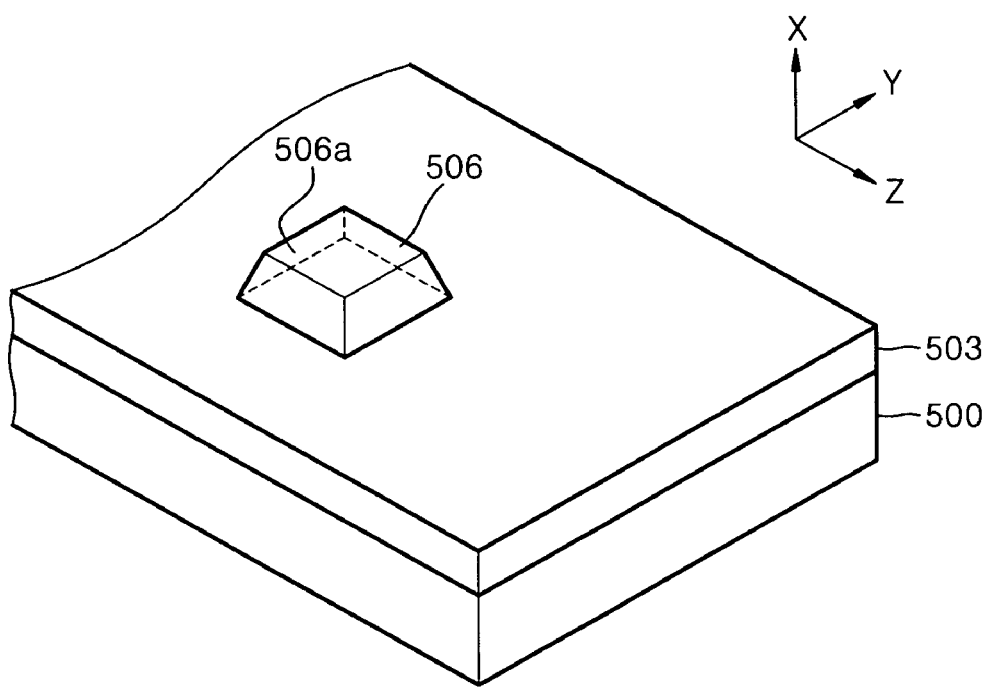

Referring to FIG. 5B, a portion of the second insulation layer 506 on which the first photoresist 509 is not formed is etched such that the second insulation layer 506 has a shape having an inclined plane 506a.

Figure 5C:
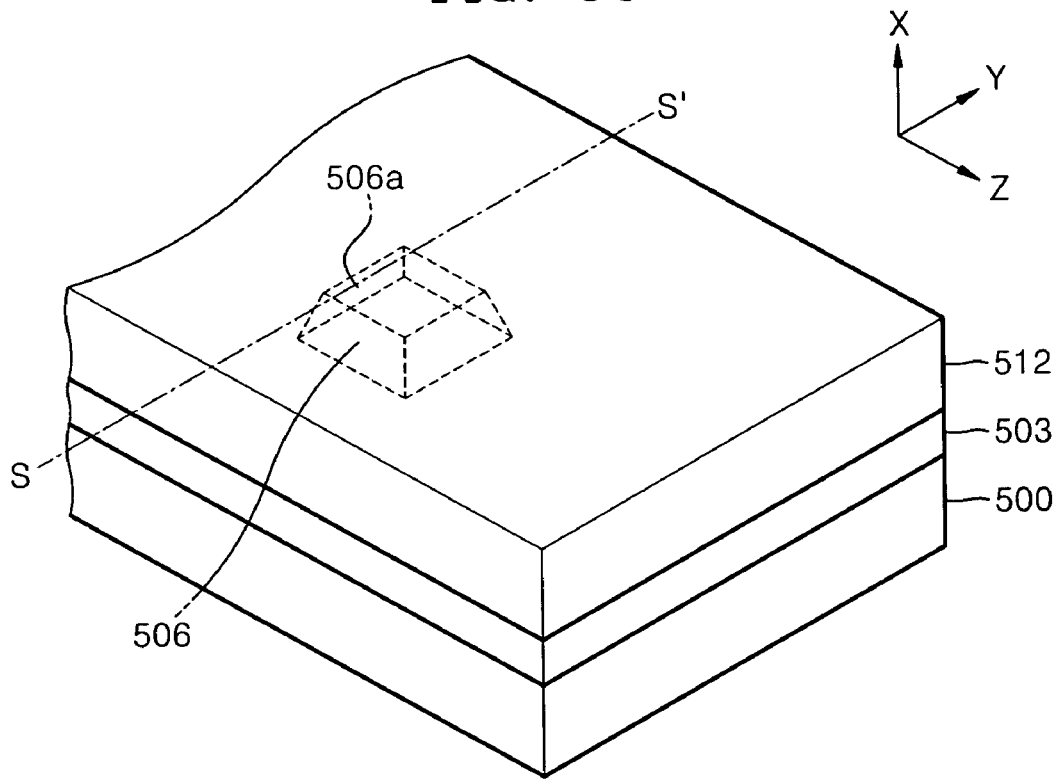

Referring to FIG. 5C, a first magnetic layer 512 is deposited on the first insulation layer 503 and the second insulation layer 506 such that the second insulation layer 506 is embedded within the first magnetic layer 512.

In a process described later, an ABS is formed in parallel to an X-Y plane. For example, a cross-section along S-S' passing through the inclined plane 506a of the second insulation layer 506 may be the ABS.

Figure 5D:
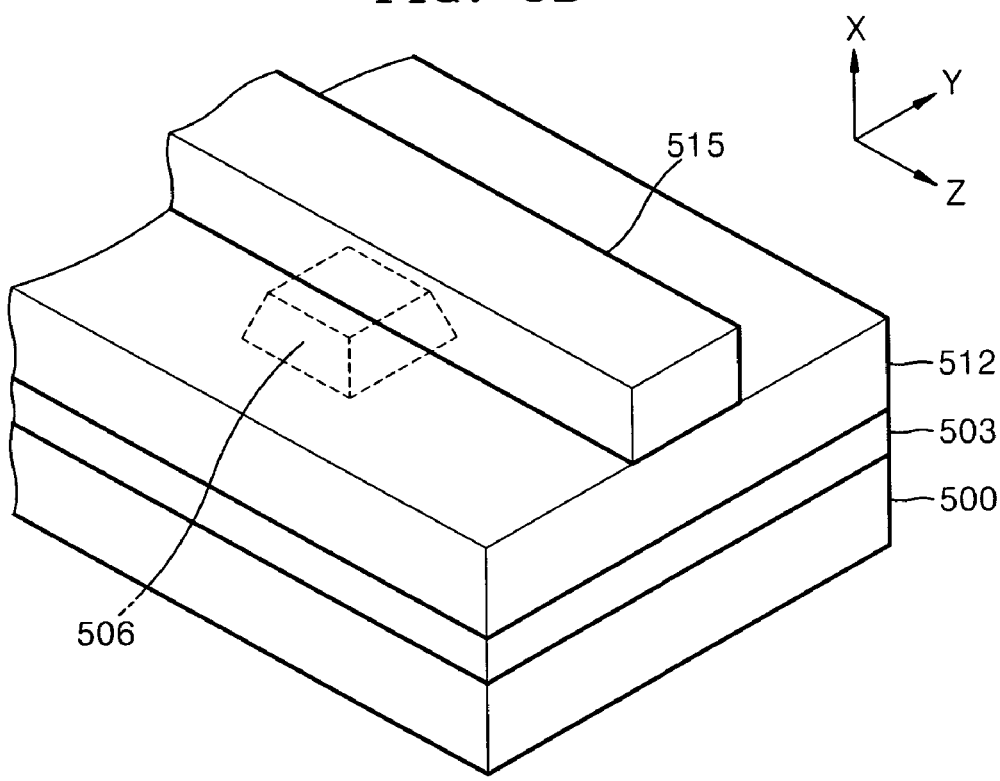

Referring to FIG. 5D, a second photoresist 515 is formed on the first magnetic layer 512.

Figure 5E:
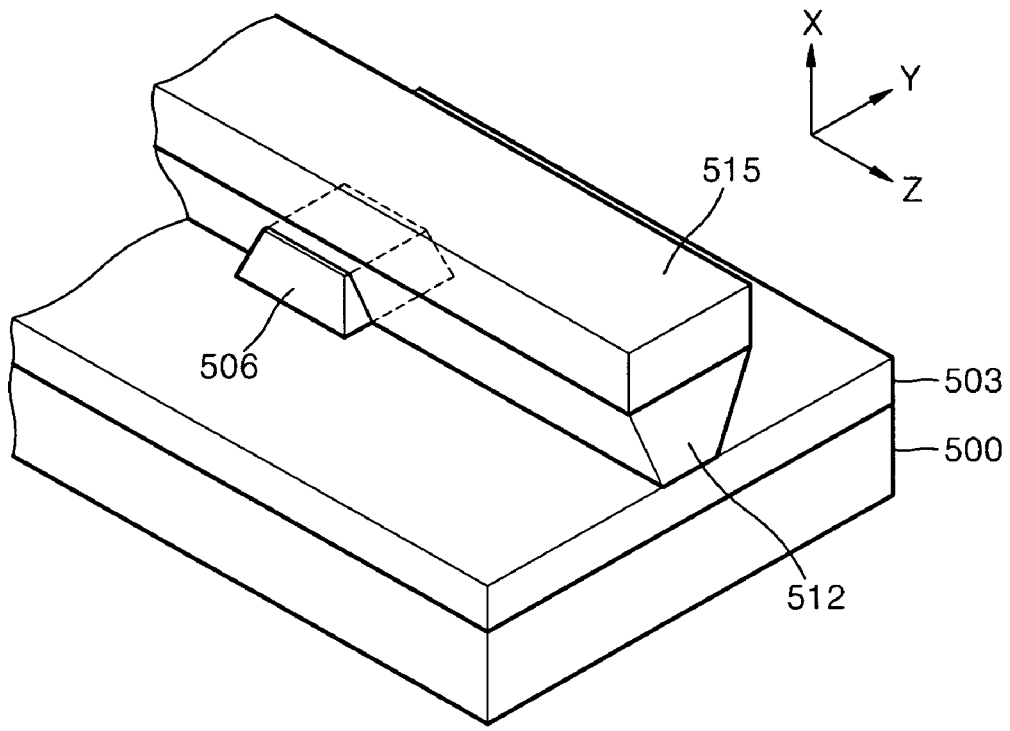

Referring to FIG. 5E, the first magnetic layer 512 on which the second photoresist 515 is not formed is etched.

Figure 5F:
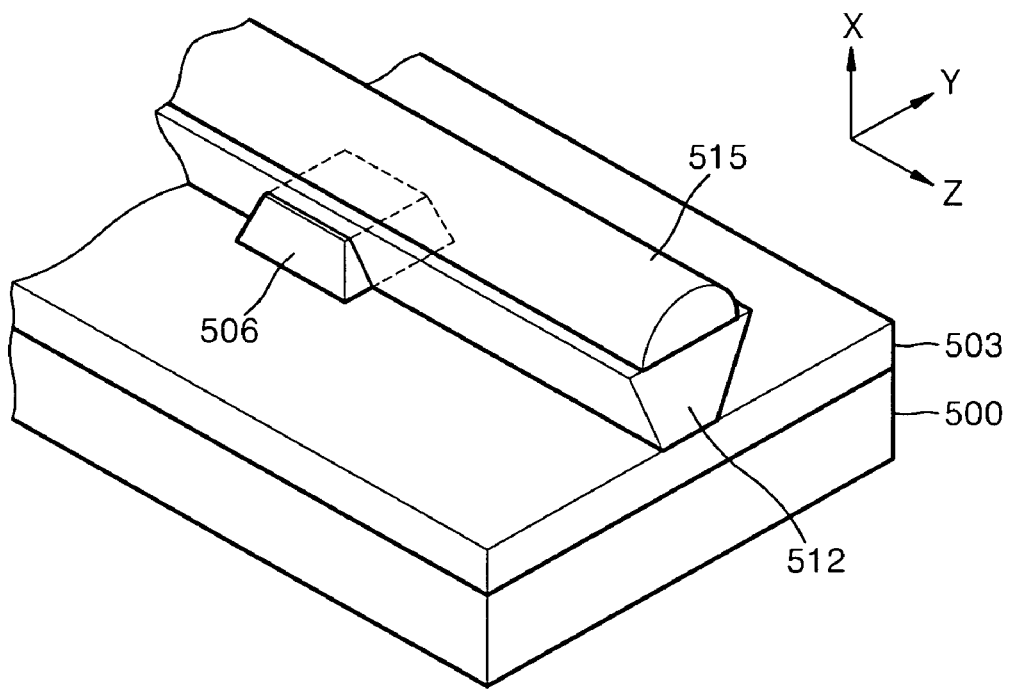

Referring to FIG. 5F, part of the second photoresist 515 on the first magnetic layer 512 is removed to expose both upper edges of the first magnetic layer 512. At this point, an ashing process using $O_2$ plasma may be used.

Figure 5G:
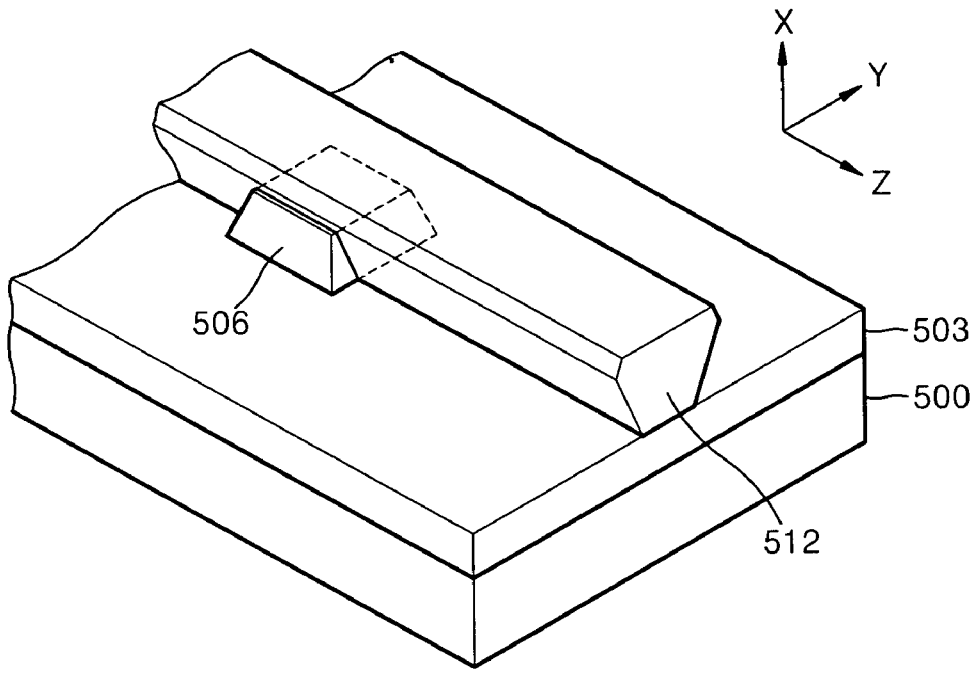

Referring to FIG. 5G, a chamfer process is performed on the edge portions of the first magnetic layer 512, and the ashed second photoresist 515 (of FIG. 5F) is removed.

At this point, the process of FIG. 5F may be omitted. That is, after the second photoresist 515 on the first magnetic layer 512 is removed in the process of FIG. 5E, the shape of FIG. 5G may be formed using a chamfer process.

The chamfer process may be performed using, for example, dry etching.

Figure 5H:
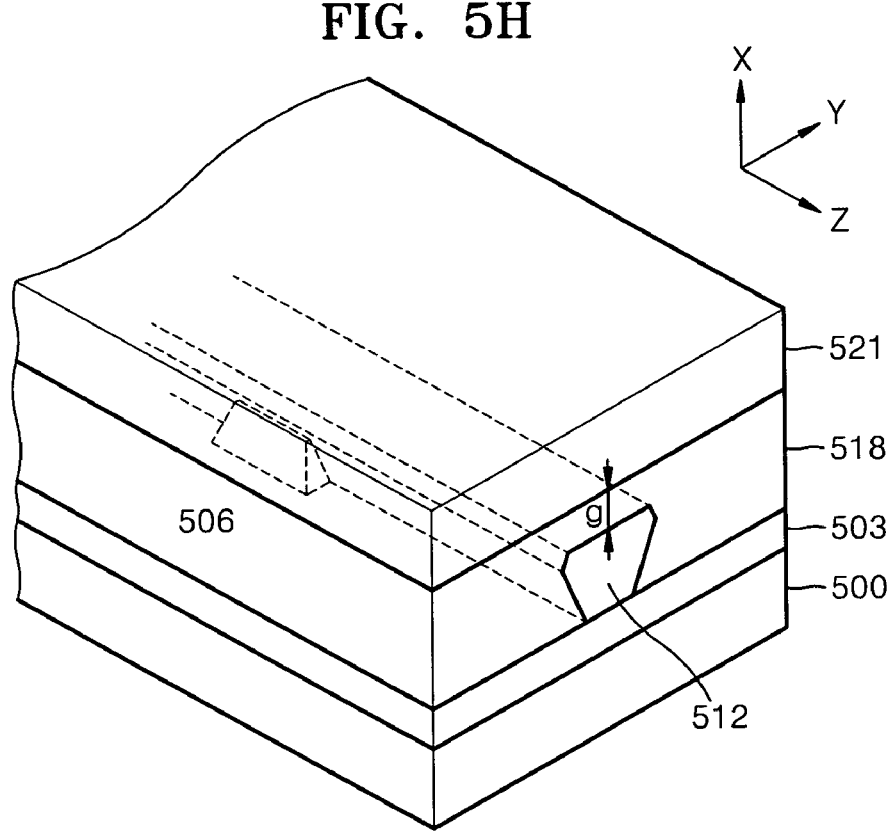

Referring to FIG. 5H, a third insulation layer 518 is formed on the first insulation layer 503 and the first magnetic layer 512, and a second magnetic layer 521 is formed on the third insulation layer 518.

At this point, a distance between the first magnetic layer 512 and the second magnetic layer 521 becomes a gap distance g, which may be formed less than about 500 nm as described above.

In the above process, the first and second magnetic layers 512 and 521 may be formed of NiFe, and the first through third insulation layers 503, 506, and 518 may be formed of $Al_2O_3$.

Figure 5I:
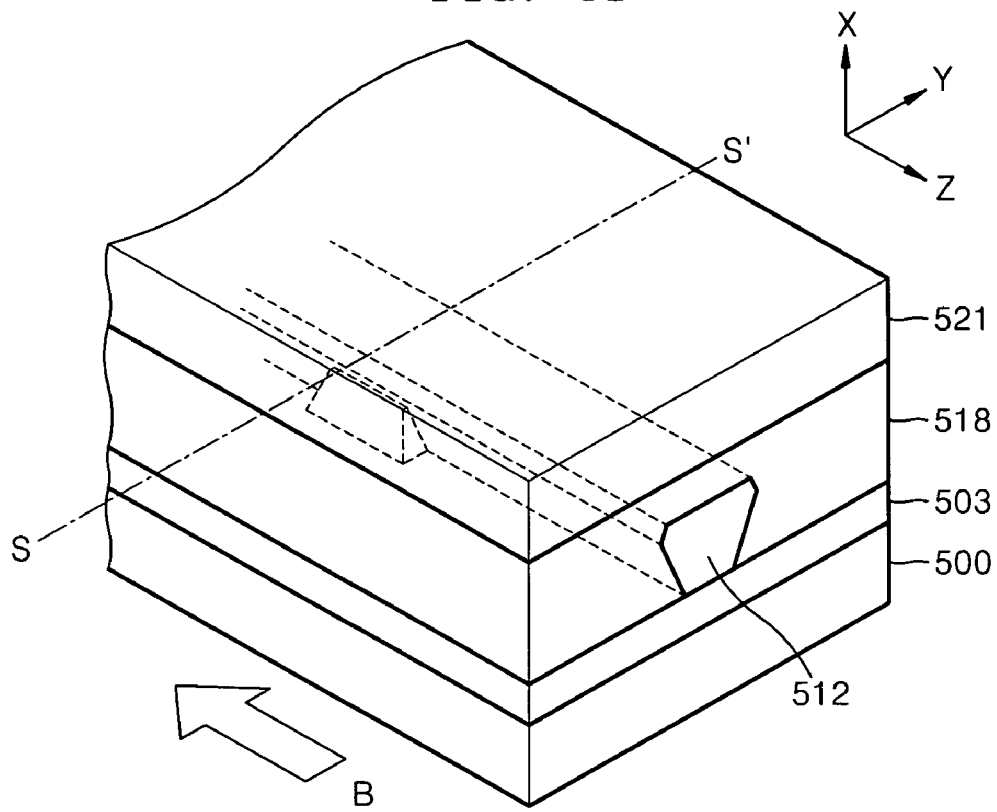

Referring to FIG. 5I, a lapping process is performed up to a cross-section S-S' along a direction of an arrow B.

Figure 5J:
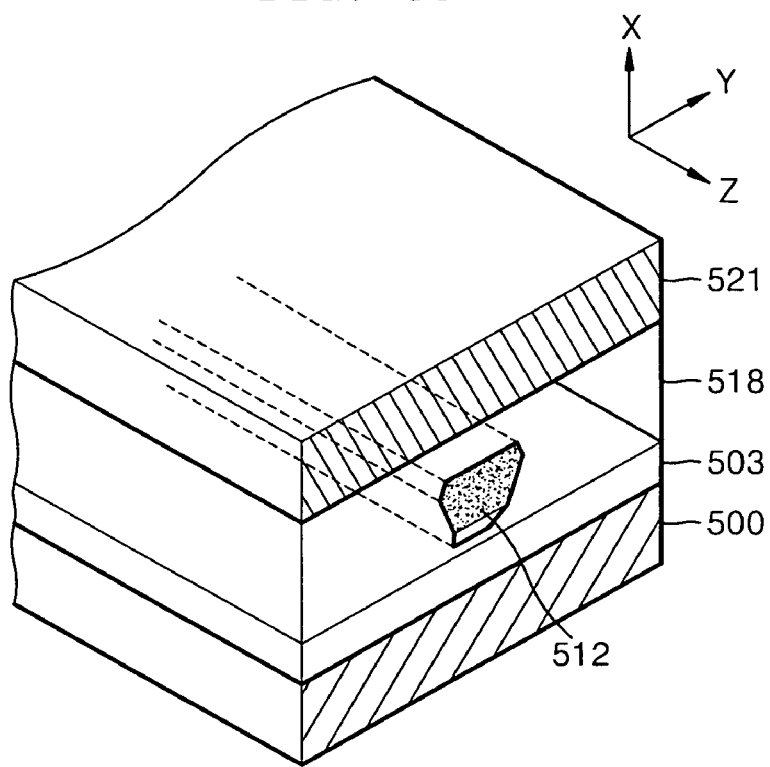

Referring to FIG. 5J, a plane inclined with respect to the ABS is formed at the lower portion of the end of the first magnetic layer 512, and a shape of which two upper edges are cut is completed.

The present invention having the above construction provides a perpendicular magnetic recording head having an improved recording characteristic in high density recording, and a manufacturing method thereof.

It is possible to achieve recording that requires a shorter length in a track direction and minimize influence on magnetization of an adjacent track by improving the shape of the end of a main pole. Also, a manufacturing method consistent with the present invention provides a method of easily manufacturing a perpendicular magnetic recording head having a main pole of an improved structure by adding a simple process to a conventional magnetic recording head process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A perpendicular magnetic recording head for one of recording and reading information on or from a perpendicular magnetic recording medium, the perpendicular magnetic recording head comprising:
   a coil serving as a source generating a magnetic field for recording;
   a main pole forming a magnetic path of the magnetic field, having an end that faces the perpendicular magnetic recording medium, wherein the end comprises a leading part serving as a front side and a trailing part serving as a rear side with respect to a movement direction of the perpendicular magnetic recording medium; the trailing part having edges that are chamfered; and the leading part having a plane inclined with respect to an air-bearing surface (ABS); and
   a return pole forming the magnetic path of the magnetic field in cooperation with the main pole, and having one end spaced apart from the main pole at the ABS and the other end connected with the main pole,
   wherein a plane of the main pole that faces the perpendicular magnetic recording medium has a hexagon shape.

2. The perpendicular magnetic recording head of claim 1, further comprising a sub-yoke located closely to one side of the main pole and having one end that faces the perpendicular magnetic recording medium and is spaced from the ABS in a direction of separation from the perpendicular magnetic recording medium.

3. The perpendicular magnetic recording head of claim 2, wherein the main pole is formed of a material having greater saturation magnetic flux density than that of the sub-yoke.

4. The perpendicular magnetic recording head of claim 1, wherein a spacing distance between the main pole and the return pole on the ABS is less than about 500 nm.

5. The perpendicular magnetic recording head of claim 1, further comprising a read head unit having an end facing the perpendicular magnetic recording medium.

* * * * *